United States Patent

Nunes, Jr.

[15] 3,664,432
[45] May 23, 1972

[54] SOD HANDLING APPARATUS

[72] Inventor: John F. Nunes, Jr., 2037 Loquot Ave., Patterson, Calif. 95363

[22] Filed: Mar. 17, 1969

[21] Appl. No.: 807,594

[52] U.S. Cl. ................................172/19, 270/68, 198/33
[51] Int. Cl. ..........................................................A01b 45/04
[58] Field of Search ...........................172/19, 20, 1; 270/68; 214/390; 198/33

[56] References Cited

UNITED STATES PATENTS

| | | | |
|---|---|---|---|
| 2,761,542 | 9/1956 | Pagdin | 198/33 |
| 3,519,082 | 7/1970 | Miner | 172/1 |
| 2,740,627 | 4/1956 | Woodward et al. | 270/68 |
| 2,770,457 | 11/1956 | Jesus | 270/68 |
| 2,811,350 | 10/1957 | Cran et al. | 270/68 |
| 3,134,587 | 5/1964 | Sjostrom | 270/68 X |
| 3,235,011 | 2/1966 | Pasinski et al. | 172/19 |
| 3,375,877 | 4/1968 | Pasinski et al. | 172/19 |
| 3,387,666 | 6/1968 | Hadfield | 172/20 |
| 3,415,399 | 12/1968 | Nunes | 214/390 |
| 3,485,304 | 12/1969 | Daymon | 172/19 |
| 3,509,944 | 5/1970 | Brower et al. | 172/19 |

Primary Examiner—Robert E. Pulfrey
Assistant Examiner—Stephen C. Pellegrino
Attorney—Flehr, Hohbach, Test, Albritton & Herbert

[57] ABSTRACT

A sod handling apparatus for folding sod employs a first means for engaging and advancing a length of sod relative to the apparatus while a second means for further engaging and advancing the length of sod is selectively reversible. Means are provided for detecting an appropriate moment for reversing the feeding of the forward portion of the sod. At that time, the forward feeding means is reversed and raised to form a gap through which cyclically moving surfaces travel in a common direction so as to feed the folded edge of the sod through the gap and onto a conveyor forming a continuation of the original sod path. A cross conveyor is mounted to receive the rearwardly advancing folded sod whereby workmen standing in work stations of a trailing vehicle can remove the sod and place it on a pallet or other platform within the sod carrier vehicle following the sod folding apparatus. As the folded sod is placed upon the cross conveyor, a portion of the under surface of the folded sod is not permitted to contact the cross conveyor whereby the remaining portions engage the cross conveyor and serve to twist the orientation of the line of fold of the sod commodity with respect to the direction of movement of the cross conveyor. The machine pursues a method following the steps of continuously advancing a length of sod along a path, reversing the direction of movement of one of the portions of the sod relative to the movement of another portion of the same length of sod while conjointly therewith elevating the reversed portion with respect to the other portion so as to initiate folding one of the portions onto the other.

11 Claims, 12 Drawing Figures

INVENTOR.
John F. Nunes, Jr.

INVENTOR.
John F. Nunes, Jr.
BY Flehr, Hohbach, Test, Albritton & Herbert
Attorneys INVENTOR.
John F. Nunes, Jr.
BY Flehr, Hohbach, Test,
Albritton & Herbert
Attorneys

SOD HANDLING APPARATUS

BACKGROUND OF THE INVENTION

This invention pertains to sod handling apparatus of a type for conveying sod along a delivery path and more particularly to a sod handling apparatus of a type for folding short lengths or slabs of sod and for properly orienting such folded slabs with respect to the direction of movement of the slab in the region of work stations. The invention also pertains to a method for carrying out the foregoing objectives.

Various growing conditions and agricultural considerations have, in the past, required that not all sod be rolled and it has been found that in some circumstances it is better to fold the sod in a manner whereby the foliage side of a first portion of the sod be folded over into confrontation with the foliage side of another portion of the same sod slab.

The folded sod is, of course, picked up from a field where it is grown and must be loaded into carriers or other vehicles for delivery to warehouses or customers. For example, one such carrier vehicle for mobilized loading of sod is shown in my U. S. Pat. No. 3,415,399 wherein a pair of work stations are provided alongside an accumulation zone adapted to contain a pallet upon which sod can be loaded. A transversely extending cross conveyor receives sod which can be then manually lifted by workers in the work stations onto the pallet carried in the accumulation zone of the carrier vehicle.

In the past, attempts have been made to automate the folding of sod slabs but typically these efforts have been directed towards the clapping together of the leading and trailing portions of the slab of sod. These arrangements have, accordingly, been considerably expensive and worked with only limited success.

SUMMARY OF THE INVENTION AND OBJECTS

In general, there is provided herein a sod handling apparatus comprised of a first means for engaging and advancing a length of sod relative to the apparatus. A second means further engages and advances the same length of sod, the first and second means being arranged to conjointly engage longitudinally displaced portions of the length of sod. Thus, the second means supports the leading portion of the slab of sod, while the first means is in position to support the trailing portion thereof. Further, means have been provided for reversing the advancing movement of one portion with respect to the other conjointly with a raising of the reversed portion in a manner to cause it to overlay the other portion which is continuing its relative advancement toward the reversed portion.

The general method of folding a slab of sod to dispose the foliage surface of a first or leading portion to lie upon the foliage surface of a second or trailing portion is accomplished by following the general steps of continuously advancing a length of sod along a given path, reversing the direction of movement of one of the sod portions relative to the movement of the other while conjointly therewith elevating the reversed portion with respect to the other portion so as to initiate folding one of the portions onto the other.

In a more particular procedure and taking advantage of the buckling of the sod between its oppositely moving portions, a confining gap is formed conjointly with the formation of the buckled, folded edge wherein the confining gap is bounded by surfaces moving in a common direction through the gap thus formed so as to engage the outer surfaces of the buckled sod. Further, the step is taken of engaging and moving the top and bottom surfaces of the over-folded sod to advance the sod at substantially the same speed from both the top and bottom.

It is, accordingly, a general object of the present invention to provide an improved sod handling apparatus.

Another object of the invention is to provide a sod folding machine whereby a slab of sod may be folded in a manner overcoming the above and other problems.

A further object of the invention is to provide a sod handling apparatus of a type wherein an over-folded sod commodity will be properly oriented for manual engagement or otherwise from a conveyor carrying the sod along a delivery path.

A further object of the invention is to provide a sod folding apparatus for folding sod and which can detect those lengths of sod below a predetermined length and pass them along the sod delivery path in an unfolded state so as to minimize handling time.

The foregoing and other objects of the invention will become more readily apparent from the following detailed description of a preferred embodiment when considered in conjunction with the following drawings.

DESCRIPTION OF THE PREFERRED EMBODIMENT

In harvesting sod which has been pre-cut as it lies in a field various means have been provided in the past to roll the sod and otherwise form the sod into a commodity which can be handled manually. The sod, of course, is also handled manually other than at times when it is being harvested. However, for purposes of illustrating the present invention, the apparatus for folding sod is disclosed in conjunction with the chassis of a tractor vehicle 10. In general, reference may be made to my U. S. Pat. No. 3,415,399 which shows the provision of a tractor vehicle equipped with means for picking up, rolling and transporting the rolled sod commodity transversely of the path of movement of the tractor where it can be handled and placed upon a pallet by workers carried in work stations arranged at the side of the pallet.

Figure 1:
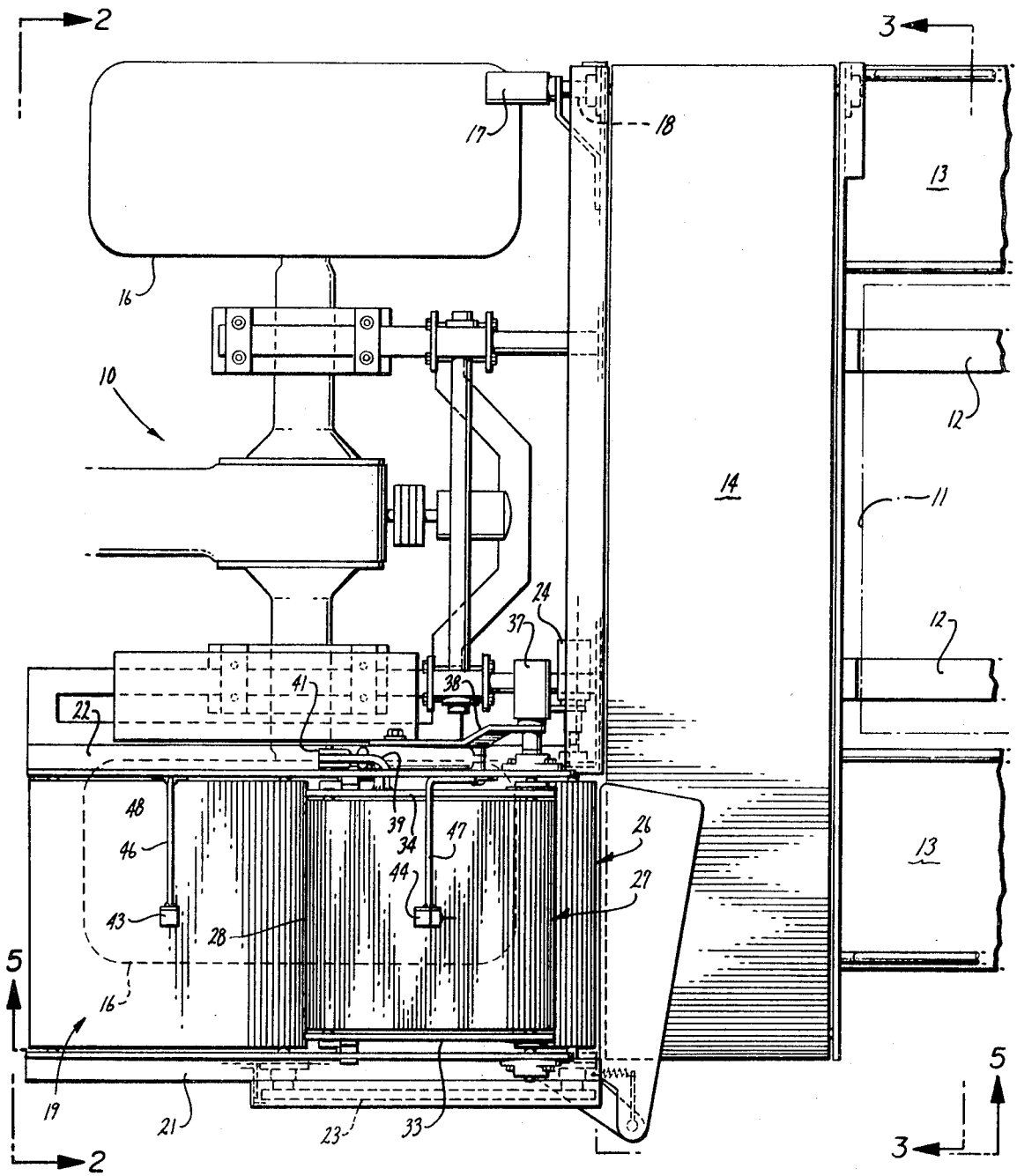
FIG. 1 is a plan view of sod handling apparatus according to the invention.
Figure 2:
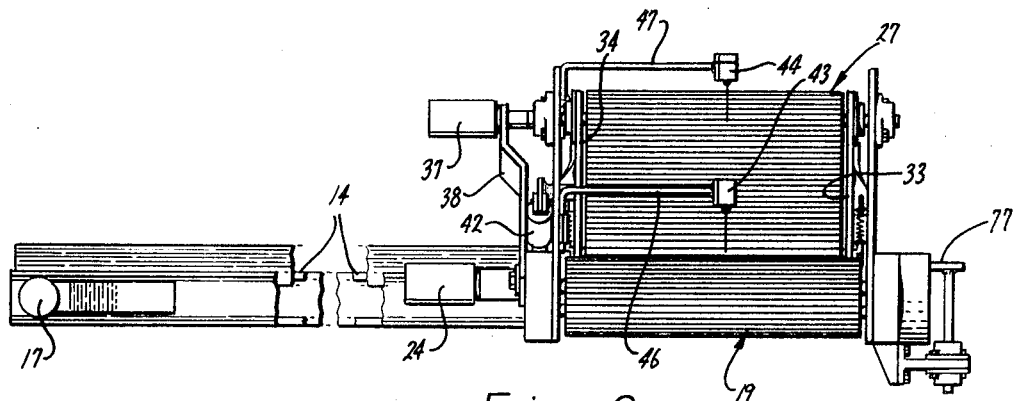
FIG. 2 is a front elevation view of FIG. 1 taken along the line 2—2 of FIG. 1.
Figure 3:
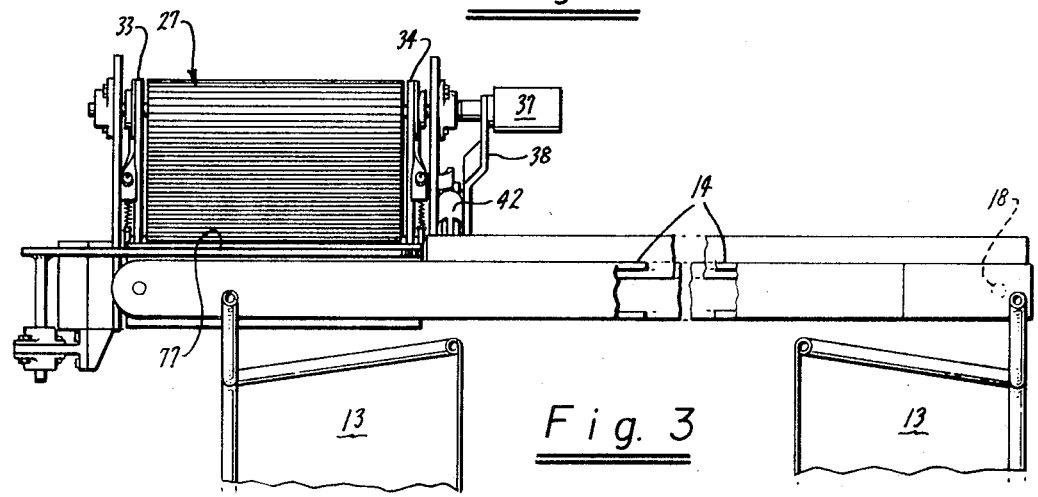
FIG. 3 is a rear elevation view of FIG. 1 taken along the line 3—3 of FIG. 1.

With reference to FIG. 1, a pallet 11 has been shown supported upon the tines 12 of a fork-lift style machine for raising and lowering the level of the pallet. Work stations 13 of a type, for example, as shown in the above identified patent are arranged at the side of pallet 11. A transversely extending cross conveyor assembly 14 carries folded sod, as will be explained further below, from one work station to the other whereby workers at either of the two stations, or both, are in a position to remove the sod. Sod judged by the workman as being unsatisfactory can be permitted merely to be discharged at the open end of conveyor assembly 14.

The entire trailing apparatus is drawn by vehicle 10 which rides on conventional pneumatic tires 16.

Operation of the various components of the apparatus to be described below is mainly by means of hydraulic connections and devices of conventional design and, for clarity, hydraulic hoses have not been shown connected to the hydraulic motors since the manner of making these connections will be readily evident to those skilled in this art. An electro-hydraulic control system is, however, shown in FIG. 4 for operation of the hydraulic system of the apparatus shown in the remainder of the figures. For example, a hydraulic motor 17 of conventional design is connected to the drive shaft 18 for operation of the cross conveyor 14.

Slabs of sod which, in the present instance, have been picked up by suitable means referred to in the above identified patent and referenced application cited therein, are handled at the side of vehicle 10 by a sod folding apparatus now to be described.

Means providing a sod supplying conveyor 19, cyclically driven continuously in a common direction, supplies sod to be folded and is carried between side frame members 21, 22. Conveyor 19 is driven by means of the cyclically operated belt or chain 23 operated by hydraulic motor 24. Motor 24 also drives a delivery conveyor 26 in the same direction as the direction of operation of supply conveyor 19 so as to form a continuation of the sod advancing path.

Figure 8:
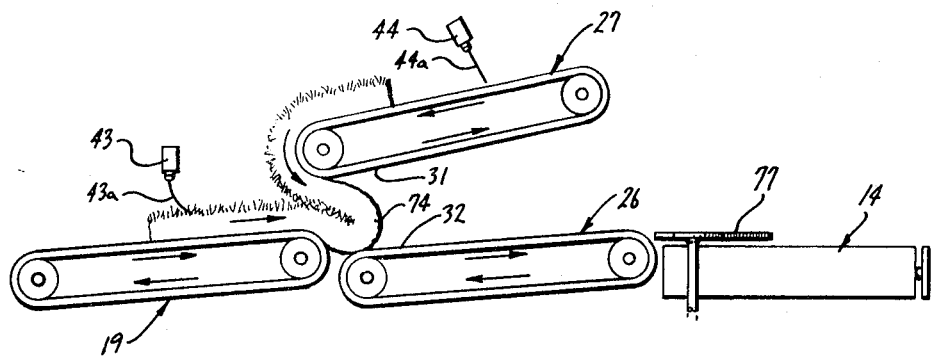
Figure 9:
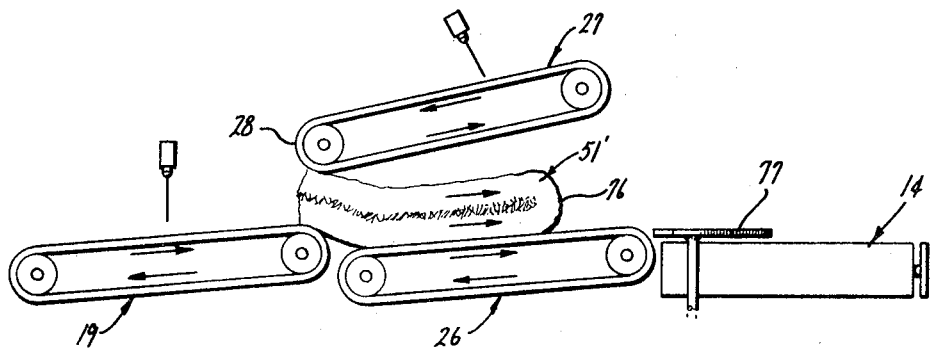

Immediately above delivery conveyor 26, a sod buckling or folding conveyor 27 is arranged to be cyclically driven in each of two opposite directions whereby it can be reversed. Conveyor 27 is also arranged whereby one edge of the cyclic conveyor can be elevated with respect to the underlying conveyor 26. Thus, by raising the leading end 28 of conveyor 27, a sod confining gap 29 is formed bounded by surfaces, such as reaches 31, 32, moving in a common direction through the gap at a position which serves to engage the outer surfaces of sod buckled into that gap. These confronting reaches 31, 32, as will be described further below, engage and move the top and bottom surfaces of the over-folded sod commodity passing through the gap to advance at substantially the same speed so as not to unfold the sod (FIG. 8).

Figure 10:
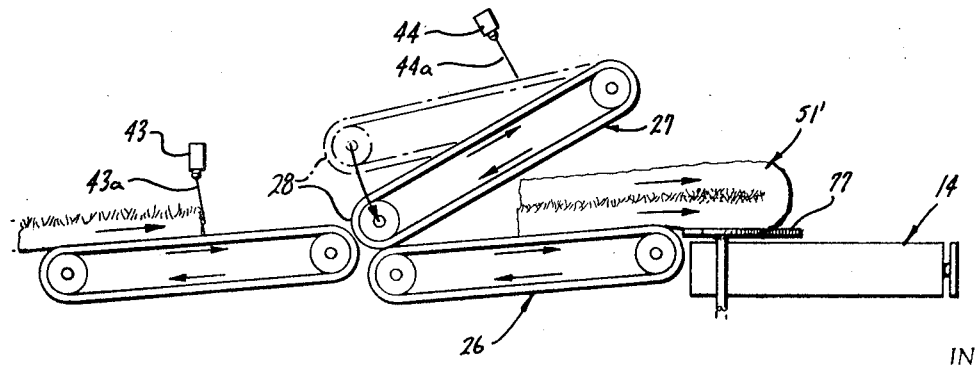

Conveyor 27 includes conventional side frame plates 33, 34 arranged with transversely extending axles (not shown) carried in the ends thereof for supporting a belt or other cyclically drivable conveyor means trained therebetween. Conveyor assembly 27 is arranged to pivot for movement upwardly and downwardly as shown, for example, in FIG. 10 whereby after sod has arrived in position on the upper reach of conveyor 27, the conveyor 27 may be raised to form gap 29.

Thus, the upper end of conveyor 27 is pivotally supported upon its driving axle 36 which is journalled at each of its ends but is driven by the hydraulic motor 37 supported at an elevated position by means of the side plate 38. Motor 37 is arranged to be quickly reversibly driven as will be further explained below.

As noted above, the leading end 28 of conveyor 27 is arranged to be moved between elevated and retracted positions. This is accomplished through the connection made by contact with an elevator arm 39 fixed to side frame member 34. Arm 39 is coupled to a clevis 41 carried on the end of a piston rod extending out of the hydraulic elevator cylinder 42. Thus, by actuation of hydraulic cylinder 42, conveyor 27 will be raised or lowered selectively as desired.

Figure 4:
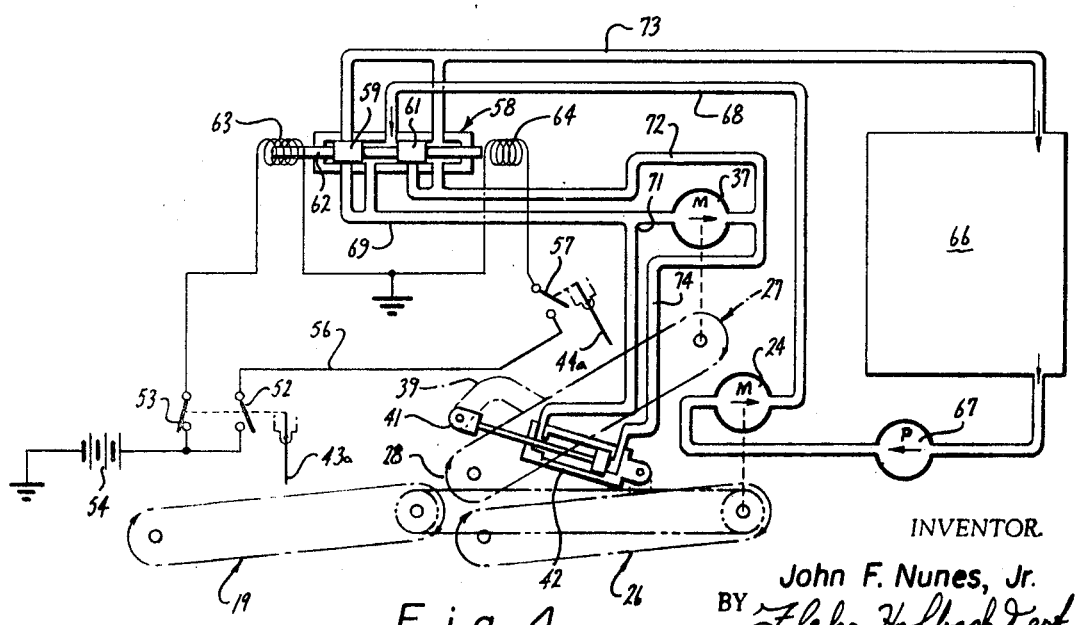
FIG. 4 is a schematic electro-hydraulic diagram showing means for controlling the operation of apparatus according to the invention.
Figure 5:
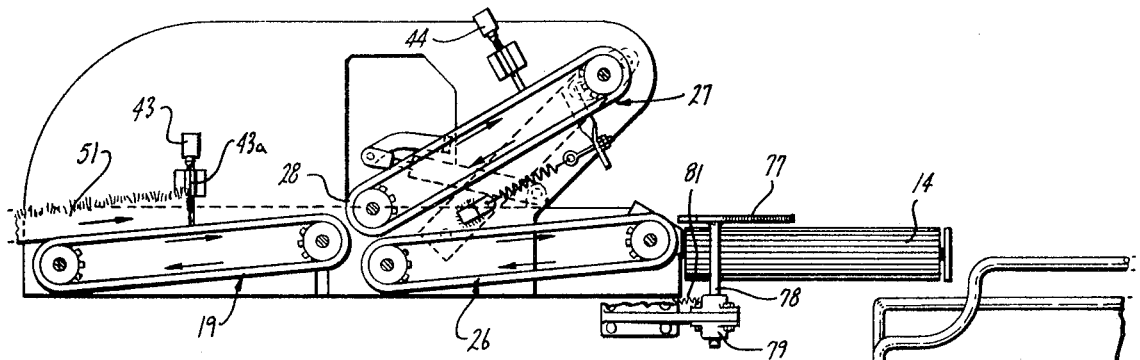
FIGS. 5 – 10 illustrate the sequential steps in folding a slab of sod diagrammatically illustrated with respect to the apparatus disclosed in other views.
Figure 6:
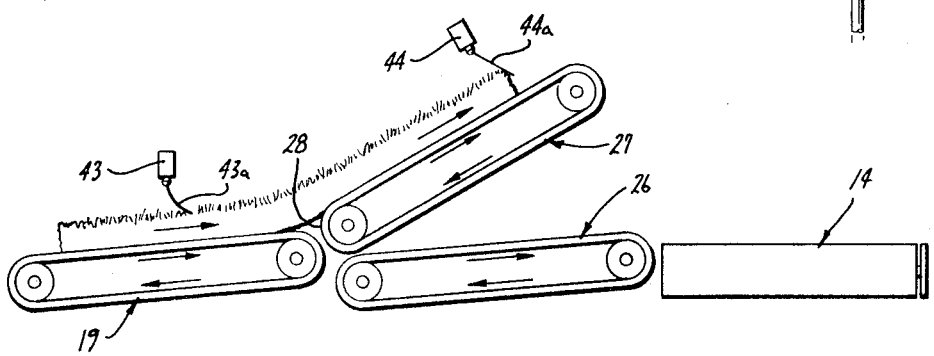

Means have been provided for detecting the transient disposition of an intermediate portion (longitudinally) of the sod when the longitudinally intermediate portion is disposed adjacent or proximate to the region of gap 29. Thus, microswitches 43, 44 equipped with downwardly depending feeler elements or fingers 43a, 44a, respectively, for operating electrical control circuitry of FIG. 4, are respectively mounted to dispose their respective feelers immediately above and in the path of advancing sod. Means for supporting microswitches 43, 44 include the swing arms 46, 47, respectively, one of which, at least, is pivotally arranged, as at point 48, whereby the longitudinal spacing between microswitches 43, 44 may be adjusted as desired.

Having the foregoing structure in mind, sod being handled by the apparatus can be readily folded as now to be described with particular reference to the electro-hydraulic control circuit shown in FIG. 4 and the sequential steps illustrated in FIGS. 5 – 10.

Accordingly, as a slab of sod 51 is advanced along its path by means of conveyor 19, the leading end of slab 51 ultimately strikes the feeler 43a of microswitch 43.

This movement of feeler 43a serves to transfer both contact armatures 52, 53 of the microswitch associated with feeler 43a. By thus transferring the armatures 52, 53 from the positions as shown in FIG. 4, a power source such as the battery 54 will be connected to enable line 56 whereby at a later point in the travel of the leading edge of slab 51, feeler 44a will be moved to operate switch armature 57.

With reference to FIG. 4, there is disclosed a hydraulic control circuit utilizing a double acting spool valve 58 formed with conventional control spools 59, 61 mounted upon a transfer shaft 62. Coils 63, 64, when energized, serve to shift the shaft 62 to one position or the other.

In the condition shown in FIG. 4, a hydraulic sump 66 supplies hydraulic fluid via a pump 67 to operate the hydraulic motor 24. The output from motor 24 is discharged along line 68 and fed through valve 58. From valve 58 the hydraulic fluid moves along line 69 to the junction 71 for supplying hydraulic motor 37 and conditioning the hydraulic cylinder 42 to retract its piston rod thereby lowering, and maintaining lowered, the leading end 28 of conveyor 27.

The output from hydraulic motor 37 is delivered along line 72 via valve 58 to return to sump 66 along line 73.

Thus, the foregoing condition of the electro-hydraulic control arrangement in FIG. 4 presents a condition of readiness to receive and handle sod to be folded. As the leading edge of a slab 51 of sod strikes the feeler 43a, the microswitch associated therewith will shift the condition of armatures 52, 53 so as to enable line 56 and place it in readiness for completing a circuit to operate coil 64. At the same time, armature 53 opens the circuit from battery 54 whereby coil 63 is deenergized. The leading end 28 of conveyor 27, being normally in the path of movement of sod slab 51, engages the leading edge of the sod and serves to divert and advance the sod relatively upwardly along its path of movement.

Means for reversing the movement of conveyor 27 with respect to the continuously advancing movement of conveyor 19 while conjointly elevating the leading end 28 of conveyor 27 for raising one portion of sod slab 51 with respect to a trailing portion includes circuitry energized by closing of switch armature 57. Armature 57 thereby operates coil 64 while coil 63 is deenergized. Coil 64 readily shifts the spools 59, 61 to a condition whereby the supply of hydraulic fluid arriving via line 68 is directed along line 72 by virtue of the fact that spool 59 blocks the right-hand input to line 69, and spool 61 opens line 72 for direct connection to line 68. Hydraulic pressure applied to line 72 thereby is applied via the lower end of line 72 designated, herein, 74. This pressure initially acts to raise the lowered end of conveyor 27. As the pressure builds up in response to elevating the lowered end of conveyor 27, motor 37 will become reversed with the return supply of hydraulic fluid being fed along line 69 through return line 73.

With the above structure in mind, therefore, and making particular reference to the sequence of operation shown in FIGS. 5 – 10, it will be readily evident that in operation a slab of sod 51 will strike the feeler associated with microswitch 43 so as to pre-condition or "enable" microswitch 44 and at the same time pre-condition the double acting spool valve 58 whereby it will be in condition to be shifted.

The leading end 28 of conveyor 27 is normally in the path of movement of slab 51 and serves to engage the leading edge thereof so as to divert and upwardly advance slab 51 until microswitch 44 has been operated. At that point, assuming that slab 51 is of sufficient length, both microswitches will be in a shifted condition. By conjointly operating both microswitches 43, 44 under the influence of slab 51, it will be readily evident that valve 51 will shift immediately so as to very quickly initially elevate the lowered end 28 of conveyor 27 and immediately thereafter commence reverse operation of hydraulic motor 37 driving conveyor 27 rearwardly relative to the advancing driving movement associated with conveyor 19.

It will be readily evident that in the event that slab 51 falls below a predetermined length, both microswitches 43, 44 will not be operated conjointly and, accordingly, the movement of feeler 44a will be ineffective due to the fact that its power line 56 has not been pre-conditioned or pre-coupled to the battery 54. This arrangement is particularly desirable since short lengths of sod will then merely be discharged directly over the elevated upper end of conveyor 27 without attempting to fold these pieces. As mentioned above, the cross conveyor 14 will permit the ready discharge at its open end of such undesirable pieces. In the event that these pieces are not undesirable but are merely short slabs of sod intermixed with the longer foldable slabs, both types of sod can be accommodated by the same machine.

Figure 7:
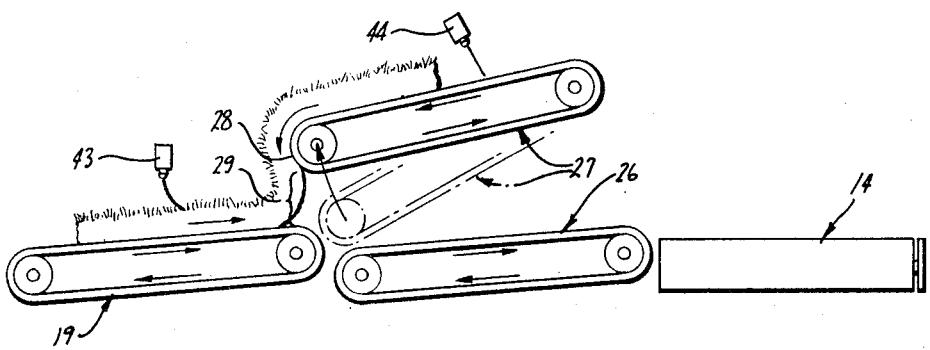

Having commenced operation of conveyor 27 in a reverse mode or style as depicted in FIG. 7 with its formerly lowered end 28 now in an elevated condition to provide a gap 29 separating the two portions of the sod path, the reverse movement of the leading portion of slab 51 in conjunction with the advancing movement of the trailing portion of slab 51 serves to cause the sod to buckle and be folded in the region of gap 29 and forced therethrough.

Accordingly, the folded edge 76 of slab 51 passes through the gap and onto delivery conveyor 26 whereby the two confronting reaches 31, 32 moving in a common direction serve to advance the sod further along its path for discharge. The folded sod commodity 51' moves directly toward means located in the path of movement of the sod for orienting the folded edge 76 to extend transversely of the path of movement of the sod commodity 51' but at a trailing portion thereof.

In this manner the re-oriented folded edge 76 will lie at an angle substantially between 30° to 60° with respect to its direction of movement in that portion of its path of movement defined by the cross-conveyor 14.

This orientation of the folded edge 76 conveniently locates the folded corners of the sod commodity 51' whereby workmen standing adjacent cross conveyor 14 in work stations 13 can handle the product with more ease.

Figure 11:
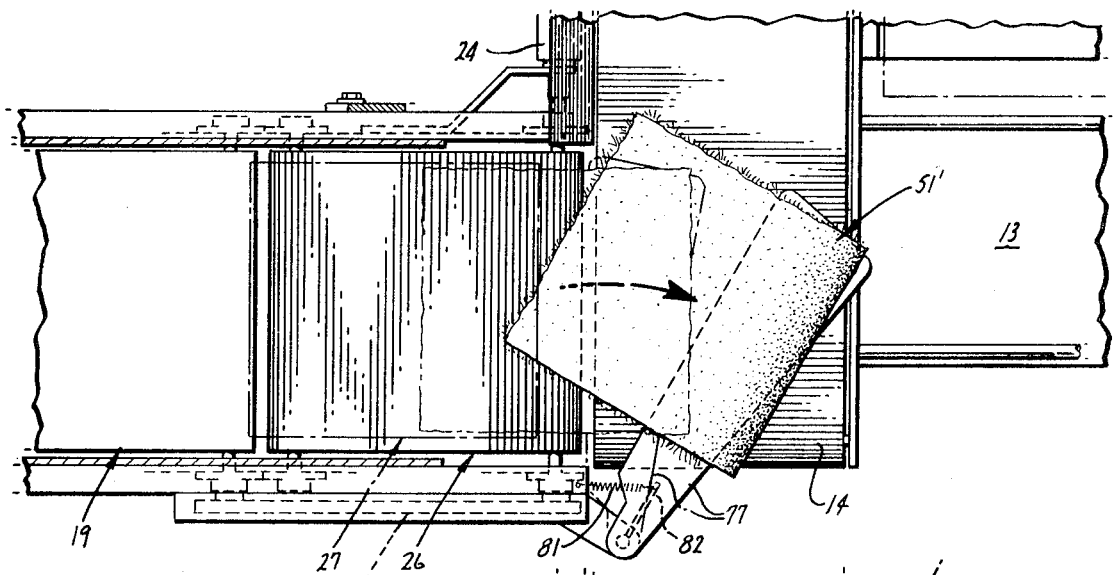
FIG. 11 is a plan view diagrammatically illustrating initial steps in the functioning of means for re-orienting the folded edge of a slab of sod.

Thus, referring to FIG. 11 and the schematic representations shown in FIGS. 5 – 10, a relatively broad, thin orienting arm 77 swings rearwardly of the vehicle about a pivotal axis provided by the upright support rod 78 journalled at its lower end in a pivot mounting 79. An elongated coil spring 81 is coupled to a short lever arm 82 so as to normally urge the orienting arm 77 to a position where it extends transversely of the path of sod moving on conveyor 26. Thus, arm 77 forms something of a continuation of the support surface of conveyor 26 in a position to receive the leading portion of the folded sod commodity 51'.

As sod 51' is received upon arm 77, it pivots about the axis of rod 78 as shown in FIG. 11. Thus, portions of sod commodity 51' are supported upon arm 77 while other portions are unsupported by the arm and are, therefore, supported by the transversely moving upper surface of cross conveyor 14.

Figure 12:
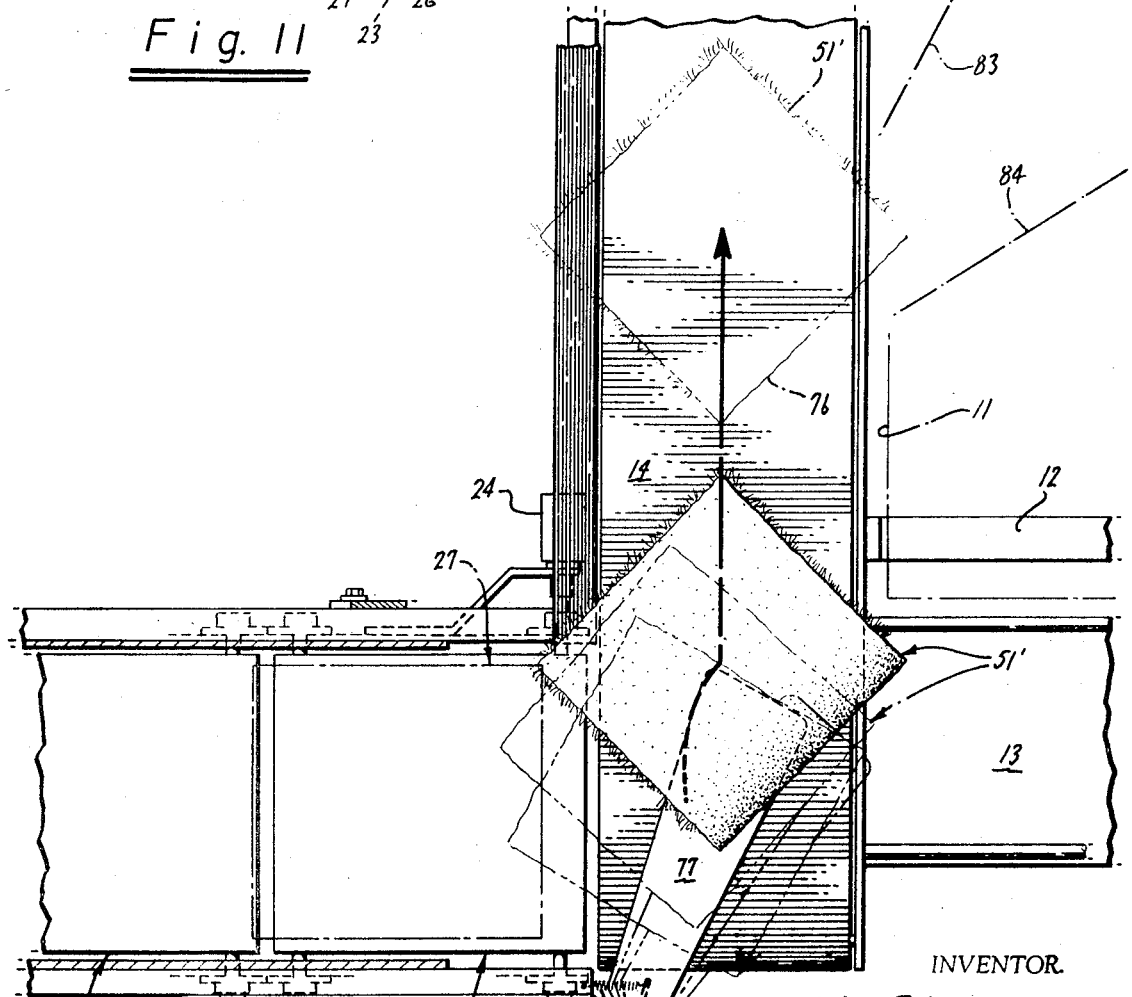
FIG. 12 shows continued movement of the re-oriented slab of sod in conjunction with apparatus according to the invention.

It is to be observed, in addition, that delivery conveyor 26 continues to urge the trailing portions of the sod article 51' in a direction serving to further swing arm 77 about its pivot axis and thereby expose more of the under surface of sod article 51' to the transversely moving surface of conveyor 14. Ultimately, conveyor 14 will withdraw the folded sod commodity 51' from arm 77 as shown in FIG. 12 and in a manner whereby the folded edge 76 will have been re-oriented to its path of movement to a point where it is now on the trailing side of the product being delivered and at a disposition on the order of between 30° and 60° indicated by the phantom lines 83, 84.

In this position article 51' can be more readily gripped by workmen standing in work stations 13 and, accordingly, less fatigue will be involved in their work.

I claim:

1. In a sod handling apparatus, first conveyor means for advancing a length of sod in a given direction along a predetermined path thereof, second conveyor means including an end thereof normally disposed in said path for engaging the leading edge of the advancing sod, lifting means for elevating said end of said second conveyor means to move said end between lowered to elevated positions, said second conveyor means serving to divert and continue to advance the sod generally in the same relative direction while conveying the sod relatively upwardly above said path, reversible drive means coupled to operate said second conveyor means to advance or reverse the movement of sod carried by said second conveyor means, means for reversing said drive means to reverse the advance of said second conveyor means with respect to the advancing movement of said first conveyor means and means for operating said lifting means to elevate said end of said second conveyor means conjointly with reversal of said drive means so as to raise a leading portion of the sod while reversing the advance of said leading sod portion relative to an oncoming advancing trailing portion whereby the leading portion is overlaid onto said trailing portion for continued movement in overlaid condition along said path and to pass beneath the elevated end of said second conveyor means.

2. In a sod handling apparatus according to Claim 1 further including means serving to detect those lengths of sod below a predetermined length and to advance same on said second conveyor means to discharge same free of reverse movement thereof directly into the path of sod movement in an unfolded state.

3. Sod handling apparatus according to Claim 1 further comprising means forming a continuation of said first conveyor means disposed to receive and engage the sod in overlaid condition and to carry same further along said path.

4. Sod handling apparatus according to Claim 3 further comprising means disposing a portion of said second conveyor means to engage the opposite side of the overlaid sod for advancing the sod together with the advancing movement provided by the continuation of the first conveyor means while said second conveyor means is moving in its reverse mode.

5. Sod handling apparatus according to Claim 1 further comprising a generally flat support arm pivotable about an upright axis through one end, said arm forming substantially a continuation of the plane of said first conveyor means and disposed transversely to said path to receive and orient the sod to dispose the folded edge of the overlaid sod to extend transversely of said path and at a trailing position for the advancing overlaid sod product and adapted to permit a worker to grip the folded sod product at its folded edge for removal from said path.

6. In a sod handling apparatus, means for advancing a length of sod along a predetermined path, means for folding the sod travelling in said path to form a folded leading edge extending transversely of the path, a generally broad flat support arm pivotable about an upstanding axis through one end, said arm forming substantially a continuation of said path and disposed transversely thereof to receive thereon and re-orient said folded leading edge to extend transversely of said path and at a trailing portion of the advancing overlaid sod, and means forming a work station adjacent said path and confronting the re-oriented folded edge for a worker to grip the sod at the folded edge for removal from said path.

7. Sod handling apparatus according to Claim 6 wherein the support arm serves to re-orient the folded edge to lie at an angle substantially between 30° to 60° with respect to its direction of movement in said path.

8. In a sod handling apparatus, a mobile frame for movement across a field, a sod folding assembly supported by said frame for folding a leading portion of a slab of sod onto a trailing portion thereof, said assembly comprising first and second conveyors disposed in tandem for feeding a length of sod along a predetermined path, means for relatively separating first and second portions of the path to form a gap therebetween, means for detecting the transient disposition of a longitudinally intermediate portion of the sod when proximate to said gap, and means responsive to the last named means for relatively reversing the direction of travel of said second conveyor to reverse the leading portion of the sod while continuing to relatively advance the trailing portion of the sod to buckle and form a folded edge of said sod in the region of said intermediate portion, means to move said folded edge into said gap, and means to draw the folded sod therethrough.

9. Sod handling apparatus according to Claim 8 wherein said first conveyor includes a first cyclic carrier having a reach thereof serving to support and advance the sod thereon, and said second conveyor includes a cyclic carrier disposed in the path of sod carried on said first carrier to receive sod therefrom, the sod-receiving end of the last named carrier being movable between first and second positions in response to said detecting means to form said gap.

10. In a sod handling apparatus, a sod folding assembly comprising first and second conveyor belts disposed in tandem for advancing a length of sod in a given direction, means for sensing the disposition of a longitudinally intermediate portion of the sod between said first and second conveyor belts, means for separating said first and second conveyor belts in response to said sensing means to form a gap between said first and second conveyor belts and reversible drive means responsive to said sensing means to reverse the feeding of a leading portion of the sod relative to the advancing movement of a trailing portion of the sod so as to buckle and fold the leading sod portion onto the trailing sod portion to form a folded edge therebetween and means to direct said edge through said gap for further transfer of the sod in said direction.

11. Sod handling apparatus according to Claim 10 wherein said gap has a thickness corresponding substantially to the thickness of the overfolded sod, and said first and second conveyor belts conjointly engage the bottom and top surfaces of the folded sod to feed the folded sod through said gap.

* * * * *